United States Patent Office 3,228,903
Patented Jan. 11, 1966

3,228,903
PROCESS FOR CONTROLLING THE HYDROLYSIS OF AN ORGANO-SILANE TO FORM A STABLE DISPERSION
William J. Dennis, Guelph, Ontario, Canada, assignor to Fiberglas Canada Limited, Toronto, Ontario, Canada
No Drawing. Filed Aug. 16, 1963, Ser. No. 302,723
Claims priority, application Canada, Nov. 21, 1958, 762,973
5 Claims. (Cl. 260—29.6)

The present invention relates to compositions for treating the surface of glass fibres.

This application is continuation-in-part of my copending application Serial No. 853,691 filed November 18, 1959, now abandoned.

It is well known to use glass fibres for the reinforcement of resinous materials and is normal practice to pre-heat such glass fibres in order to improve the adhesion between the fibres and the resin. It has been found to be especially advantageous to apply to the glass fibres a composition containing as a coupling agent capable of establishing a good bond between the glass and the resin, a hydrolysis product of an unsaturated organo-silane, for example, a vinyl or alkyl silane, containing hydrolysable groups attached to the silicon. Both acid and alkaline hydrolysis procedures have been proposed for the hydrolysis of the unsaturated organo-silanes.

The hydrolysis of the organ-silane produces a silanol which then polymerises with the formation of silicon-oxygen-silicon bonds. The polymerisation should not proceed to too great an extent prior to the application of the fibre as otherwise the affinity of the polymeric product for the surface of the glass is too low for it to become strongly bonded to the glass. As would be expected it is not easy to control the rate of polymerisation in a reliable manner. It seems likely that over-polymerisation may be responsible for the difficulty which has been experienced in practice in formulating glass sizes or finishes that have reproducible characteristics as measured by the physical properties of the treated glass fibres. Despite the wealth of publications relating to the production of glass-treating compositions containing organo-silane derivatives it is at present more of an art than a science to formulate on a commercial scale a size that will impart to glass fibres, in a readily reproducible fashion, the desired physical properties.

The present invention is based on the discovery that if the hydrolysis of the unsaturated organo-silane is carried out in the manner hereinafter specified, the degree of polymerisation can be kept under control.

The invention provides a composition for treating glass fibres comprising an unsaturated organo-silane polymer obtained by hydrolysing a hydrolysable unsaturated organo-silane at a pH between 7 and 8 to produce a colloidal suspension of a water-insoluble unsaturated organo-silane polymer and then arresting the hydrolysis by adjusting the pH to between 3 and 6.

Under the mildly alkaline conditions used for hydrolysing the organo-silane the rate of polymerisation of the silanol produced is relatively slow. Varying the time for which hydrolysis is continued thus serves as a simple method of adjusting the degree of polymerisation. In practice it is unnecessary to determine what degree of polymerisation has been attained. A few trial runs serve to show what time of hydrolysis corresponds to optimum physical properties of the treated glass fibre; this time will depend of course on many factors such as the purpose for which the treated glass fibre is to be used, the nature of the organo-silane, and the reaction conditions in general.

Some of the known procedures for hydrolysing organo-silanes have involved the hydrolysis of an unsaturated organo-silane at an alkaline pH but the pH employed has been strongly alkaline, by contrast with the mildly alkaline pH used according to the present invention. When carrying out the hydrolysis under strongly alkaline conditions there is obtained a polymerised alkali metal siloxanate which is water-soluble and stable at the high pH employed. The pH of the composition may then be adjusted to an acid value by the addition of an acid before applying the hydrolysed product to glass fibres.

In the hydrolysis procedure of the present invention the alkaline reagent which is employed is not present in high concentration, relatively little of it being required in order to create the mildly alkaline pH prescribed, so that it acts not as a chemical reactant as do the concentrated alkaline reagents of the prior art but merely to furnish the desired pH environment for effecting hydrolysis of the unsaturated hydrolysable organo-silane and for forming a polymer which is water-insoluble. The hydrolysed organo-silane polymer produced exists as a colloidal suspension in water; if allowed to stand for some time, the suspended phase will actually separate out as a solid deposit. Because of the small amount of alkaline reagent used, the quantity of acid that must be added in order to bring the pH to the acid side is also small and the result is that there is very little formation of soluble salts by contrast with prior alkaline hydrolysis procedures. The presence of such salts in a composition for treating glass fibers is most undesirable because being water-receptive they represent a possible source of weakening of the bond between the glass fibers and the resinous material if the reinforced resinous material is subjected to high moisture conditions. For this reason, previous procedures of preparing glass fibers for inclusion in resinous materials have often involved washing the treated fibers with water in order to remove soluble salts. Not only is this an undesirable complication of the manufacturing process but it is not easy to ensure that most of the soluble salts are removed. It is much better to minimize the formation of such salts so that a washing procedure can be dispensed with; this is made possible by the hydrolysis procedure utilized according to the present invention.

The nature of the alkaline and acid reagents used according to the invention is not critical. The alkaline reagent serves only to maintain the pH of between 7 and 8 which has been found to give rise to the formation at a controlled rate of the water-insoluble unsaturated organo-silane polymer previously referred to and the acid serves only to arrest the hydrolysis and to bring the pH to a value at which the colloidal solution is stable. Conveniently ammonia is used as the alkaline reagent but it may be substituted by the hydroxides or carbonates of the alkali metals or by any other reagent capable of creating the specified pH value. Hydrochloric acid is very suitable as the acid reagent but is only representative of acid reagents in general. The small amount of salt formed during the acidification step is, as mentioned above, unobjectionable.

A wide variety of unsaturated organo-silanes can be used in the production of the composition according to the invention. The organo-silane includes at least one unsaturated group which is preferably the vinyl group but may alternatively be other unsaturated groups, for example, the allyl group. In addition to the unsaturated group the organo-silane contains hydrolysable groups such as halogen, amino, alkoxy, aryloxy, alkoxyalkoxy and aryloxyalkoxy. Thus, the organo-silanes which may be used include vinyl trichlorosilane vinyltriethoxysilane, allyltributoxysilane and methallyltrichlorosilane. These compounds are mentioned solely by way of example, the essence of the invention residing not in the silane chosen but in the specified hydrolysis procedure. However, it may be said that best results have so far been obtained by using an organo-silane containing one vinyl group and three hydrolysable groups consisting of alkoxyalkoxy or aryloxyalkoxy groups. One particular organo-silane of this type found to be especially suitable is sold under the trade name Linde A-172.

As specified above the pH at which the alkaline hydrolysis is carried out lies within the pH range of from 7 to 8. The optimum pH within this range depends on the particular organo-silane being hydrolysed. Thus, for example, it has been found that the hydrolysis of the organo-silane known as Linde A-172 is preferably carried out at a pH of 7.2.

This adjustment of the pH to 3 to 6 serves not only to arrest hydrolysis but to bring the partially polymerised hydrolysis products of the organo-silane into a region of pH at which they are relatively stable; after this adjustment has been made there is little tendency for the colloidally suspended water-insoluble hydrolysis product to precipitate or for further polymerisation to take place.

The composition of the invention may include ingredients conventional in sizes or finishes for the treatment of glass fibres. It is normal to include in a glass fibre size a film-forming agent which is commonly an emulsion of a polymeric resinous material. Polyvinyl acetate has been found to be especially suitable for this purpose and it is therefore preferred to incorporate polyvinyl acetate in the compositions of the invention. However, it is also possible to use as a film-forming agent any of the other agents which are known to be suitable. These include starch and gelatin and various resins, especially emulsions of thermoplastic resins other than polyvinyl acetate, for example polystyrene and polyvinyl alcohol.

It has been found that the efficiency of a polyvinyl acetate emulsion as a film-forming agent can be markedly increased by including therein a small amount of polyvinyl pyrrolidone. Therefore, it is preferred to include a small proportion of polyvinyl pyrrolidone in the polyvinyl acetate when the latter is used as a film-forming agent.

In Canadian application Serial No. 762,973 in the name of W. J. Dennis filed on even date herewith there is described and claimed a process for modifying the properties of polyvinyl acetate as a film-forming agent in compositions for treating the surface of glass fibres which comprises treating the polyvinyl acetate with a strong acid prior to admixing it with the other ingredients of the composition. It is found that fibres treated with a size formulated from such pre-treated polyvinyl acetate shown markedly improved properties in respect of the dissipation of static electricity. Accordingly, it is preferred to use in the compositions of the present invention a polyvinyl acetate emulsion which has been subjected to treatment with a strong acid prior to inclusion in the composition. This strong acid, which is preferably hydrochloric acid, may serve wholly or partially as the acid reagent for arresting the hydrolysis of the organo-silane.

It is conventional to include in a glass size a lubricant which serves to facilitate flexure of the fibres and of slivers and rovings made from them, and to avoid the abrasive cutting of the glass filaments by rubbing against one another which tends to occur in the absence of a lubricant thus giving rise to the formation of undesirable fuzziness constituted by projecting loose ends of glass. Many suitable lubricants are known and any of these may be incorporated in a size produced according to this invention. By way of example, suitable lubricants include dibutyl phthalate, tricresyl phosphate, and monobasic and dibasic fatty acid amides solubilized with low molecular weight fatty acids. One amide type lubricant which has been found to be especially useful is that sold under the trade name A.H.C.O. 185A.

The various optional ingredients of the compositions of the invention can be compounded by techniques known to those in the art. Similarly, the proportions of the various ingredients are selected in accordance with their individual properties and with regard to the purpose for which the size is to be used. It is well understood that the properties of the compositions must be adjusted depending on whether the glass fibres to be treated are intended to be subjected to one or other of various textile operations such as weaving and roving.

The following examples are given by way of illustration and without limitation.

EXAMPLE I

A composition which is highly satisfactory for sizing glass fibres to be used in the production of roving for weaving may be prepared as follows:

Ingredients: Amount by weight
1. Polyvinyl acetate emulsion (Delplex No. 2002), the film-forming agent __ 4.17%.
2. Vinyl triethoxy silane, the coupling agent _____ 0.66%.
3. Polyvinyl pyrrolidone (N.P.K. 30), an assist for the film-forming agent __ 0.075%.
4. Hydrochloric acid 20° Bé. for acidifying the film-forming agent _____ 0.75%.
5. Aqua ammonia _____ as required.
6. Glacial acetic acid _____ as required.
7. Water _____ remainder.

The procedure for making up the size was as follows:

Step 1.—Add 60% of the final volume of cold water to a mixing tank and agitate slowly.

Step 2.—Adjust the pH of the water to 5.0–5.5 with glacial acetic acid.

Step 3.—Add ingredient No. 2, i.e. the vinyl triethoxy silane very slowly to the acidified water. Agitate for 25 minutes to form a clear solution.

Step 4.—At the end of the 25 minutes mixing period, adjust the pH to 7.2 with diluted aqua ammonia. To facilitate obtaining close adjustment of the pH, it is convenient to dilute the aqua ammonia with 25 times its own weight of water before using it to adjust the pH.

Step 5.—When the pH of 7.2 has been attained, agitate for one hour. By this series of steps a partially polymerised vinyl silanol is obtained.

Step 6.—Dilute the hydrochloric acid, ingredient No. 4, with cold water in ratio 1 to 1 and mix thoroughly.

Step 7.—When the solution prepared according to Steps 1 to 5 has been agitating for 30 minutes of the required hours, add the hydrochloric acid, prepared according to Step 6, to the polyvinyl acetate emulsion, ingredient No. 1, and agitate slowly. The timing is arranged so that the required 30 minutes acidification of the polyvinyl acetate and the one hour treatment of the silane both terminate simultaneously.

Step 8.—When the two separate solutions have been prepared, and the necessary mixing times have elapsed, the acidified polyvinyl acetate solution is added to the silanol and further agitation effected. The resultant mixture has a pH of about 3.5. To facilitate transference of the acid mix to the main tank, it will be convenient to dilute the acid solution with an equivalent volume of cold water.

Step 9.—Ingredient 3, the polyvinyl pyrrolidone, is then dissolved in a minimum quantity of water at 160° F.

Step 10.—This solution is then cooled to 70° F. and is added to the main mix.

Step 11.—More water is added to the main mix to bring it to 95% of the required final volume.

Step 12.—The pH of the mix is adjusted to 4.0–4.5 with aqua ammonia diluted to 15 times its volume with cold water.

Step 13.—The final volume is then made up with water, agitation being continued. The size is then ready for application to the glass filaments in a conventional manner.

Comparative tests indicate that the presence of the polyvinyl pyrrolidone greatly assists the adhesive agent in producing a composite sliver of increased strength. For example, a 60 sliver roving made from glass filaments coated with a size identical with the foregoing example except for the omission of the polyvinyl pyrrolidone broke at 189 pounds. An identical roving made from glass filaments treated with the size described in the foregoing example including the polyvinyl pyrrolidone broke at 275 pounds.

It will be noted that only a small amount of the polyvinyl pyrrolidone is necessary. If too little of this ingredient were used, the increased strength would be less evident. The lower limit could be said to be a trace. The upper limit to the quantity of this ingredient is principally governed by the wetting out characteristics. This ingredient retards wetting out, i.e. ability to establish good coupling with a polyester resin in a subsequent laminating step. The commercial upper limit to the amount of this ingredient is about 5% of the polyvinyl acetate emulsion, i.e. about 0.2% of the total size. In amounts above this figure, the effectiveness of the ingredient levels off as far as improvement in strength is concerned and there is no longer any advantage to be gained from increasing the amount, especially since the wetting out properties are simultaneously deteriorated.

The use of polyvinyl pyrrolidone with the polyvinyl acetate emulsion not only provides increased strength properties and thus improves abrasion resistance for subsequent weaving operations, but also permits the use of less polyvinyl acetate than would otherwise be necessary. Without the assistance of the polyvinyl pyrrolidone, at least 25% more of the polyvinyl acetate emulsion would need to be employed to obtain the same strength.

Variations in the amounts of the main ingredients are possible. The polyvinyl acetate emulsion could vary in amount from about 1% to 8% of the total weight. As indicated in the example, the optimum amount is about 4%. As the amount is decreased the adhesion between filaments is reduced until no effective bonding is obtained. On the other hand, too much of this ingredient makes the sliver too stiff and difficult to handle and form into rovings.

In the case of the organo-silane, the preferred amount of which is 0.7%, some freedom to vary this value is available. Below about 0.4% however, the efficiency of coupling becomes too low. There is no upper limit, in the sense of introducing undesirable effects, but this is an expensive ingredient and there is seldom anything to be gained in employing more than about 0.4 to 1.0% which has been found to provide the coupling efficiency required.

As an additional feature, a small quantity of diallyl phthalate can be added to the polyvinyl acetate emulsion. An amount of diallyl phthalate up to 30% of the emulsion can be used, satisfactory results having been obtained with 15%. This further ingredient acts as a lubricant and enhances the wetting out properties, i.e. the ability of the size to condition the surfaces of the glass for firm subsequent bonding to a polyester resin. It also renders the silver processable into yarn on conventional throwing equipment.

EXAMPLE II

The procedure of Example I is followed as far as Step 5 to produce a colloidal suspension of a water partially polymerised vinyl silanol. At the end of the one hour period specified in Step 5 the hydrolysis is arrested by acidifying to pH 4 to 5 with acetic acid. The mixture is then diluted with such a volume of water as to produce a final mix containing 0.66% of the partially polymerised vinyl silanol, more acetic acid being added, if necessary to keep the pH between 4 and 5.

The composition so obtained is a valuable finishing agent for glass textile materials such as fabrics, sleevings, cords, etc. The laminate strength of such materials, if previously heat cleaned, when treated with this composition are actually higher than those of equivalent materials made from glass strands sized with the size of Example I, although the latter size makes for easier processing of the glass strands because of the additives it contains in addition to the partially polymerised vinyl silanol.

The composition of this example can be applied to heat cleaned glass fabric by a method similar to that commonly used for applying chrome and some silane finishes. Usually a padder is used and the amount of solution picked up by the fabric is controlled by squeezing between nip rolls. The fabric is then dried in an oven to remove the water and deposit the hydrolyzed silane on the fibres.

I claim:
1. A method of producing a composition for treating glass fibres comprising contacting a hydrolysable unsaturated organo-silane with an alkaline reagent in an aqueous medium at a pH of from 7 to 8, thereby effecting alkaline hydrolysis of said organo-silane to produce an organo-silanol and inducing polymerization of said organo-silanol to yield a colloidal aqueous suspension of a water-insoluble unsaturated organo-silane polymer and then arresting said hydrolysis and said polymerization by adding an acid reagent to said colloidal aqueous suspension to adjust the pH to between 3 and 6 prior to precipitation of an organo-silane polymer from said suspension and prior to complete polymerization of said organo-silanol whereby to form a stabilized colloidal aqueous suspension of said organo-silane polymer.

2. The method according to claim 1 wherein said alkaline reagent is ammonia.

3. The method according to claim 1 wherein hydrochloric acid is used as an acid reagent for arresting the hydrolysis and adjusting the pH to between 3 and 6.

4. The method according to claim 1 wherein said unsaturated hydrolysable organo-silane is a vinyl silane.

5. The method according to claim 1 wherein said unsaturated hydrolysable organo-silane is a vinyl silane containing alkoxyalkoxy or aryloxyalkoxy groups.

References Cited by the Examiner

UNITED STATES PATENTS

| | | | |
|---|---|---|---|
| 2,568,384 | 9/1951 | Cheronis | 260—46.5 |
| 2,723,211 | 11/1955 | MacMullen et al. | 260—29.2 |
| 2,834,693 | 5/1958 | Jellinek | 260—29.2 |

MURRAY TILLMAN, *Primary Examiner.*